United States Patent Office 3,538,100
Patented Nov. 3, 1970

1

3,538,100
PROCESS FOR PREPARING HIGHLY
CHLORINATED PYRIDINES
Eric Smith, Madison, Conn., assignor to Olin Corporation, a corporation of Virginia
No Drawing. Continuation-in-part of application Ser. No. 472,013, July 14, 1965. This application Mar. 15, 1968, Ser. No. 713,307
Int. Cl. C07d 31/26
U.S. Cl. 260—290    4 Claims

ABSTRACT OF THE DISCLOSURE

Pentachloropyridine and 2,3,5,6-tetrachloropyridine are provided by reacting 2,6-dichloropyridine in the liquid state with chlorine at a temperature of at least 180° C. in the presence of a catalytic amount of a metallic halide, iron or aluminum. These chlorinated pyridines are useful as herbicides and as chemical intermediates.

This application is a continuation-in-part of my copending application S.N. 472,013, filed on July 14, 1965, and now abandoned.

This invention relates to a process for preparing highly chlorinated pyridines. More specifically it relates to an improved process for the preparation of 2,3,5,6-tetrachloropyridine and pentachloropyridine.

These chlorinated pyridines are known compounds having been previously prepared by a number of synthetic approaches. They are useful herbicides particularly in controlling wild oats, and they are valuable chemical intermediates. For instance they have been converted to the corresponding fluorinated pyridines which are useful functional fluids. However previous methods employed for the preparation of the aforementioned chlorinated pyridines have not been satisfactory particularly in the preparation of commercial quantities of these derivatives. Thus, pentachloropyridine has been prepared by the thermal chlorination of pyridine hydrochloride and by the reaction of pyridine N-oxide with sulfuryl chloride at elevated temperature, but both of these methods have been characterized by low yield. It has also been reported that 2,3,5,6-tetrachloropyridine has been obtained in low yield by the reaction of nicotinic acid with a mixture of phosphorus oxychloride and phosphorus pentachloride. In addition to the low yields described for the foregoing preparations, they are also characterized by complicated separation techniques since a variety of chlorine substituted pyridines are provided by these methods. Recently, as disclosed by Banks et al. in J. Chem. Soc., 1965, 594, pentachloropyridine has been prepared in high yield by heating pyridine and a large molar excess of phosphorus pentachloride under pressure at 350° C. However in order to obtain the reported high yield, it was established that a necessary 12:1 molar ratio of $PCl_5/C_5H_5N$ must be employed. This process is not satisfactory for the economical preparation of substantial quantities of pentachloropyridine.

It has also been reported that the vapor phase halogenation of pyridine and certain halogenated pyridines under stringent reaction conditions provides mixtures of various halogenated pyridines. Thus, for example, U.S. Pat. No. 1,977,662 discloses such a process wherein both independent pre-heating of the reactant vapors and the use of a contact substance are necessary to effect a reaction where low reaction temperatures, i.e. 300° C., are employed. Analogous vapor phase reactions are disclosed by H. J. den Hertog and J .P. Wibaut in Rec. trav. chim. 51, 940–50 (1932). In addition to requiring the aforementioned costly and cumbersome reaction conditions,

2 these vapor phase processes provide as products mixtures of different halogenated pyridines.

The principal object of this invention is to provide an improved process for the preparation of 2,3,5,6-tetrachloropyridine and pentachloropyridine in high yield. Another object of this invention is to provide an efficient and economical process for the preparation of substantial quantities of these chlorinated pyridines in high purity. Still another object of this invention is to provide a simplified process for the preparation of highly chlorinated pyridines which does not require tedious and costly separation procedures.

These objects have been accomplished in accordance with this invention, wherein it has been found that 2,6-dichloropyridine in the liquid state reacts with chlorine at a temperature of at least 180° C. in the presence of selected catalysts to selectively provide 2,3,5,6-tetrachloropyridine and pentachloropyridine in high yield and good purity. Cumbersome process techniques are obviated by the process of this invention. Furthermore, 2,6-dichloropyridine is a cheap and economical reactant, since it is obtained in significant quantities as a by-product in the commercial preparation of 2-chloropyridine. The process of this invention does not yield a variety of side products necessitating time consuming and costly workup procedures since only 2,3,5,6-tetrachloropyridine and pentachloropyridine are obtained by selectively controlling the amount of chlorine reactant. Thus, when one mole of 2,6-dichloropyridine is reacted with the stoichiometric quantity of chlorine required to introduce two more chlorine atoms on the pyridine ring, the desired 2,3,5,6-tetrachloropyridine only is provided in high yield. Similar results are obtained when 2,6-dichloropyridine is reacted with that amount of chlorine required to introduce three chlorine atoms, wherein pentachloropyridine is substantially selectively obtained in high yield. Thus, chlorine is utilized in essentially only stoichiometric amounts, obviating the need for an excess of chlorinating agent which is of course uneconomical even if such excess is recoverable. The chlorination described herein can be carried out efficiently at a much lower temperature range than those required in other chlorinations of pyridine (i.e., 300°–400° C.).

When the process of this invention is performed at atmospheric pressure, a reaction temperature range of 180° C. to about 220° C. is employed. The chlorination of the 2,6-dichloropyridine can be carried out at a higher temperature range, but pressure equipment is then required. For example, temperatures up to about 400° C. and higher can be employed at pressures up to about 300 p.s.i. and higher; the only limitation is that the 2,6-dichloropyridine must be in the liquid state in carrying out the process described herein. The preferred process embodiment of this invention is performed at atmospheric pressure. Preferably the preparation of the highly chlorinated pyridines by the process described herein should be performed under anhydrous conditions.

A catalyst is required in order to obtain the highly chlorinated pyridines by the chlorination of the 2,6-dichloropyridine. Included among the satisfactory catalysts which may be employed are covalent metallic halides such as ferric chloride, ferric bromide, ferric iodide, aluminum chloride, aluminum bromide, aluminum iodide, antimony pentachloride, boron trifluoride, stannic chloride, titanic chloride and the like. Alternatively, selected metals capable of being converted to covalent metallic halides under the reaction conditions (i.e., reaction with chlorine) are useful catalysts, such as iron and aluminum preferably in the powdered form. It has been found that iodine may also be employed as a catalyst in the process of this invention. However the preferred catalysts for use in the process of this invention are the ferric and aluminum halides, boron trifluoride, stannic chloride, iron and aluminum.

The aforementioned catalysts may be utilized in an amount of from about 0.1 to about 5.0% by weight based on amount of 2,6-dichloropyridine reactant. Preferably a catalyst concentration of about 1–3% by weight is employed.

Generally the process described herein comprises dispersing or dissolving the catalyst in liquid 2,6-dichloropyridine, heating the resulting solution or dispersion to at least 180° C. and contacting the mixture with chlorine until the desired 2,3,5,6-tetrachloropyridine or pentachloropyridine is obtained in high yield. Preferably the chlorine is introduced into the reaction system through a sintered glass bubbler wherein finely dispersed bubbles are provided. When the desired amount of chlorine has been added, it is advantageous to pass a stream of inert gas, such as nitrogen and the like, through the molten reaction mixture in order to remove formed hydrogen chloride and unreacted chlorine. When the reaction mixture is cooled to room temperature, it forms a crystalline product containing the highly chlorinated pyridines. The pure products are readily provided in high purity by recrystallization from solvents such as methanol, aqueous acetic acid and the like. Alternatively the pure highly chlorinated pyridines can be provided by distilling the molten reaction mixture in vacuo.

The following examples will serve to illustrate the preparation of the highly chlorinated pyridines in accordance with the process described herein.

EXAMPLE 1

A two liter, three-necked flask was equipped with stirrer, gas inlet tube, thermometer, and an air condenser. Into the flask was placed 884.0 g. (5.973 moles) of 2,6-dichloropyridine, 18.8 g. of anhydrous ferric chloride and 0.9 g. of iodine, and the gross weight of the apparatus was determined. The dichloropyridine was then heated with vigorous stirring to 200° C., and the reaction mixture was maintained at this temperature during the subsequent chlorination. Chlorine gas, dried by passage through a concentrated sulfuric acid bottle, was passed into the reaction flask until a net weight increase of 420 g. had been achieved which required about 48 hours. The theoretical weight increase required for complete formation of tetrachloropyridine is 412 grams. At this point, vapor phase chromatographic analysis of the reaction mixture indicated that it contained about 96% of 2,3,5,6-tetrachloropyridine.

A stream of nitrogen was passed through the molten reaction mixture for one hour at 200° C., and then the mixture was cooled to room temperature, providing 1290 g. of product melting at 82°–88° C. in 96% crude yield. This material is readily recrystallized from aqueous methanol or aqueous acetic acid giving white crystals melting at 89°–91° C. A melting point of 90°–90.5° C. for 2,3,5,6-tetrachloropyridine has been reported by H. J. den Hertog et al. in Rec. trav. chim., 69, 673–99 (1950).

EXAMPLE 2

Into a reaction flask, equipped as described in Example 1, was placed 605.8 g. (4.094 moles) of 2,6-dichloropyridine, 20.0 g. of anhydrous ferric chloride and 0.9 g. of iodine, and the gross weight of the apparatus was determined. The dichloropyridine was then heated with vigorous stirring to 200° C., and the reaction mixture was maintained at this temperature during the subsequent chlorination. Chlorine gas, dried by passage through a concentrated sulfuric acid bottle, was passed into the reaction flask until a net weight increase of 404.2 g. had been achieved which required about 90 hours. The theoretical weight increase required for complete formation of pentachloropyridine is 423 grams. At this point, vapor phase chromatographic analysis of the reaction mixture indicated that it contained an 84.8% yield of pentachloropyridine and a 15.2% yield of 2,3,5,6-tetrachloropyridine.

A stream of nitrogen was passed through the molten reaction mixture for one hour at 200° C., and then the mixture was cooled to room temperature, providing 1010 g. of product melting at 107°–112° C. This solid was recrystallized from methanol to provide white crystals melting at 119°–121° C. A melting point of 123°–124° C. for pentachloropyridine has been reported by B. Bobranski et al. in Ber., 71, 2385–8 (1938).

What is claimed is:
1. A process for preparing 2,3,5,6-tetrachloropyridine and pentachloropyridine which comprises:
  (a) reacting liquid 2,6-dichloropyridine with chlorine at a temperature of at least 180° C., in the presence of
  (b) a catalytic amount of a catalyst selected from the group consisting of a ferric halide, an aluminum halide, boron trifluoride, stannic chloride, iron, and aluminum,
  (c) said chlorine being employed in at least the stoichiometric amount necessary to convert said dichloropyridine into tetrachloropyridine.
2. The process of claim 1 wherein said catalytic amount is at least 0.1% by weight based on the weight of said 2,6-dichloropyridine.
3. The process of claim 1, wherein a ferric halide is employed as the catalyst.
4. The process of claim 3 wherein ferric chloride is employed as the catalyst.

References Cited
UNITED STATES PATENTS
3,426,035   2/1969   Bremmer _____ 260—290

HENRY R. JILES, Primary Examiner

H. I. MOATZ, Assistant Examiner